H. MARANVILLE.
Balance Scales.
No. 81,388.
Patented Aug. 25, 1868.
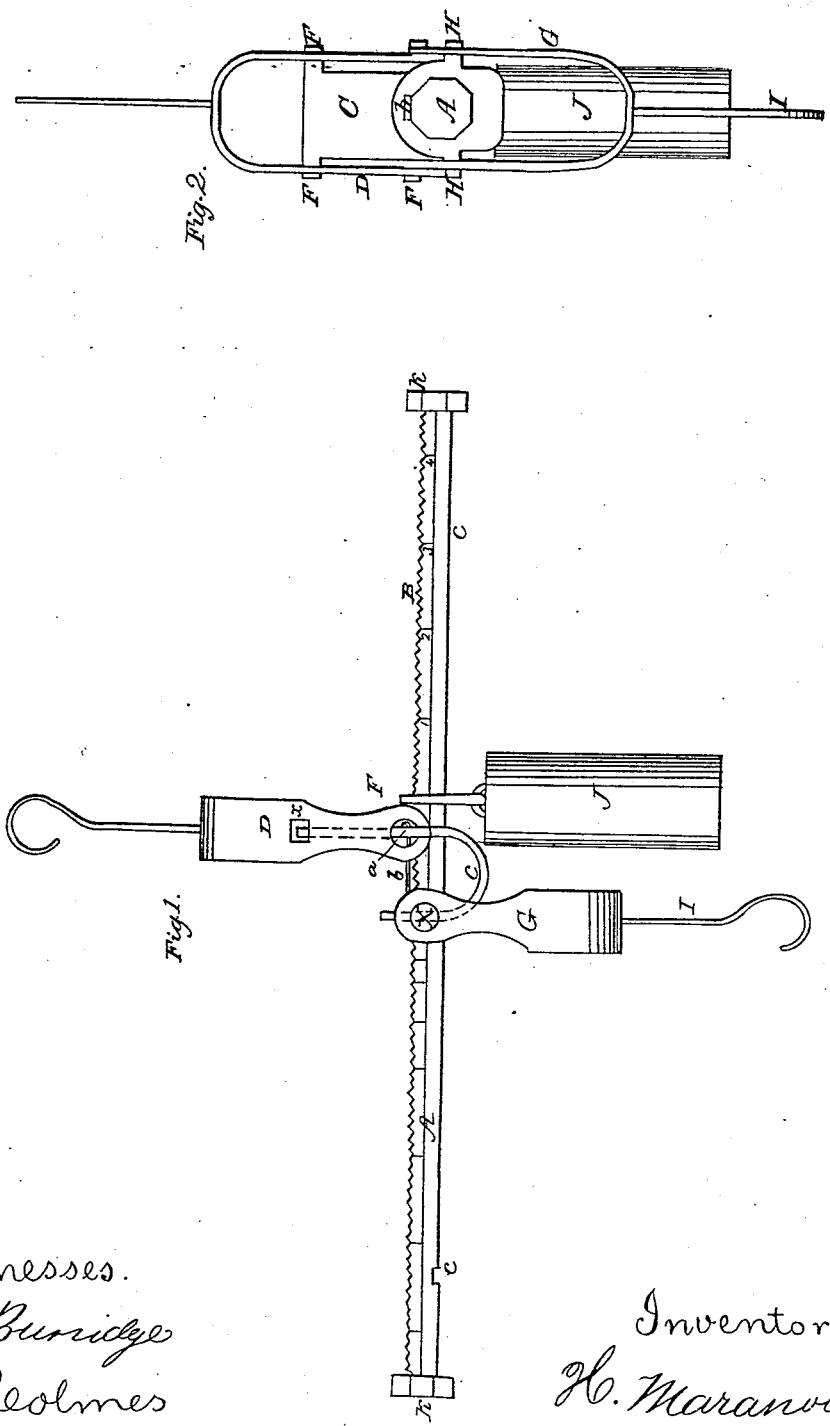

United States Patent Office.

H. MARANVILLE, OF AKRON, OHIO.

*Letters Patent No. 81,388, dated August 25, 1868.*

---

IMPROVEMENT IN STEELYARDS.

---

The Schedule referred to in these Letters Patent and making part of the same.

---

TO ALL WHOM IT MAY CONCERN:

Be it known that I, H. MARANVILLE, of Akron, in the county of Summit, and State of Ohio, have invented certain new and useful Improvements in Steelyards; and I do hereby declare that the following is a full and complete description of the same, reference being had to the accompanying drawings, making a part of this specification, in which—

Figure 1 is a side view of the steelyards.

Figure 2 is an end view.

Like letters of reference refer to like parts in the views.

In fig. 1, A represents the beam of the steelyards, which is provided with a scale of ounces and pounds, B, as in the beam of the steelyards in ordinary use. C is a loop or head, in the upturned ends of which the beam is fitted and slides, as and for a purpose hereafter shown.

D is a yoke, by which the beam is suspended from the pivots E, projecting from each side of the longest arm of the head, and protruded through the holes $a'$ in the lower ends of the yoke.

These pivots $a$ are the axis or centre of vibration.

F F, fig. 2, are lugs projecting from each side of the head through the yoke, square holes, $x$, being provided for their admission, and in which the lugs vibrate, and restrain the beam from vibrating beyond a certain degree. G is also a yoke, suspended from a pair of pivots, H, fig. 2, and to which yoke the matter to be weighed is hung on the hook I.

The position of the steelyards, as shown in fig. 1, is such as when equally balanced, the weight or poise J, being hung close to the axis at $o$, thereby counterbalancing the weight of the yoke and hook G I.

The loop is prevented from slipping along on the beam by the lower edge of the hole, through which the beam slides, by its catching in a notch cut in the lower corner of the beam, and secured therein by a spring, $b$, fig. 1.

The manner of using these steelyards is as follows: If a small quantity is to be weighed, the steelyard is adjusted as shown in fig. 1, being thus equally balanced as a common scale. It is now held in the left hand, with the weight J at the right, which is moved along on the beam from notch to notch, from pound to pound, as the weight of the article may require. Should the article be too heavy to be weighed in this adjustment of the steelyards, the head is disengaged from the notch in the under side of the beam, and then slipped along to the end, when the loop will drop into the second guide-notch $c$, thereby increasing the length of the beam without changing the scales of ounces, which will be read on the other face of the beam, or turning the beam, as is required to be done in the ordinary steelyards, which, in order to weigh heavy articles, must be turned over, changing the character of the scale from ounces to quarters, in consequence of the change needed in the length of leverage.

As above said, this steelyard weighs from a balance like a scale, and changing from one position to another does not change the space and weight between notches; one notch, or any number of them in each adjustment, reads alike.

The pivots or fulcrum being one inch apart, and the pound-notches one inch apart, and the poise-weight J one pound, hence, moving the poise one notch will balance one ounce, and moving poise sixteen notches will balance one pound, and which will be the same in either adjustment of the head.

For heavy weighing, the steelyards should be made with the pivots less distant apart, a heavier weight, and longer beam.

The weighing capacity may also be increased by putting weights or knobs, K, on each end of the beam, which, on weighing from the centre, or first position described, will balance each other, and when weighing in second position, or with the whole length of beam, will give the whole weight nearly of the knob to increase the capacity of the steelyards; thus, should the knob weigh half a pound, it will increase the weight about fifty per cent. These knobs or nuts are also used for balancing the steelyards.

What I claim as my improvement, and desire to secure by Letters Patent, is—

The loop or head C, spring $b$, as arranged, in combination with the yokes G D and beam A, for the purpose and in the manner set forth.

H. MARANVILLE.

Witnesses:
W. H. BURRIDGE,
J. HOLMES.